US006585106B1

(12) United States Patent  
Foster

(10) Patent No.: US 6,585,106 B1  
(45) Date of Patent: Jul. 1, 2003

(54) RECIPROCATING SLAT CONVEYORS

(76) Inventor: Raymond Keith Foster, P.O. Box 1, Madras, OR (US) 97741

( * ) Notice: Subject to any disclaimer, the term of this patent is extended or adjusted under 35 U.S.C. 154(b) by 0 days.

(21) Appl. No.: 10/078,846

(22) Filed: Feb. 19, 2002

(51) Int. Cl.[7] .............................................. B65G 25/04
(52) U.S. Cl. ............................... 198/750.4; 198/750.1; 198/750.3; 414/525.1; 414/525.9
(58) Field of Search ............................ 198/750.4, 750.2, 198/750.1, 750.3; 414/525.1, 525.9

(56) References Cited

U.S. PATENT DOCUMENTS

| 4,611,708 | A | * | 9/1986 | Foster | 198/750 |
| 4,679,686 | A | * | 7/1987 | Foster | 198/750 |
| 4,749,075 | A | * | 6/1988 | Foster | 198/750 |
| 4,785,929 | A | * | 11/1988 | Foster | 198/750 |
| 4,907,691 | A | * | 3/1990 | Foster | 198/750 |
| RE33,196 | E | * | 4/1990 | Foster | 198/750 |
| 5,139,133 | A | * | 8/1992 | Foster | 198/750 |
| 5,165,524 | A | * | 11/1992 | Foster | 198/750 |
| 5,238,360 | A | * | 8/1993 | Foster | 414/525.9 |
| 5,323,894 | A | * | 6/1994 | Quaeck | 198/750 |
| 5,346,056 | A | * | 9/1994 | Quaeck | 198/750 |
| 5,355,995 | A | * | 10/1994 | Foster | 198/750 |
| 5,419,426 | A | * | 5/1995 | Foster | 198/750.4 |
| 5,540,322 | A | * | 7/1996 | Foster | 198/750.3 |
| 5,560,472 | A | * | 10/1996 | Gist | 198/750.3 |
| 5,850,905 | A | * | 12/1998 | Foster | 198/750.3 |
| 5,860,507 | A | * | 1/1999 | Foster | 198/750.3 |
| 5,996,772 | A | * | 12/1999 | Foster | 198/750.3 |
| 6,006,895 | A | * | 12/1999 | Foster et al. | 198/750.4 |
| 6,019,215 | A | * | 2/2000 | Foster | 198/750.3 |
| RE37,121 | E | * | 4/2001 | Gist | 198/750.3 |
| 6,409,009 | B1 | * | 6/2002 | Foster | 198/750.2 |

* cited by examiner

Primary Examiner—Joseph E. Valenza  
Assistant Examiner—Rashmi Sharma  
(74) Attorney, Agent, or Firm—Delbert J. Barnard

(57) ABSTRACT

Bolt fasteners extend through a bottom wall (38) in longitudinal guide beams (14), to secure the guide beams (14) to transverse frame members (70, 72). The guide beams (14) include sidewalls (40, 42) which extend upwardly from the bottom wall (30) to laterally outwardly extending top flanges (44, 46). The bolts may be installed from above by use of a tool that is inserted into the space between the sidewalls (40, 42). After the guide beams (14) are secured to the frame members (70, 72), bearing/seal members (48) are friction-fitted onto the tops of the support beams (14). Conveyor slats are installed in the spaces between the support beams (14). The conveyor slats (10) include side portions (20, 22) which extend laterally outwardly into positions above the bearing/seal members (48). The side members (20, 22) include downwardly extending beads B which contact the upper surfaces (62) of the bearing/seal members (48).

16 Claims, 4 Drawing Sheets

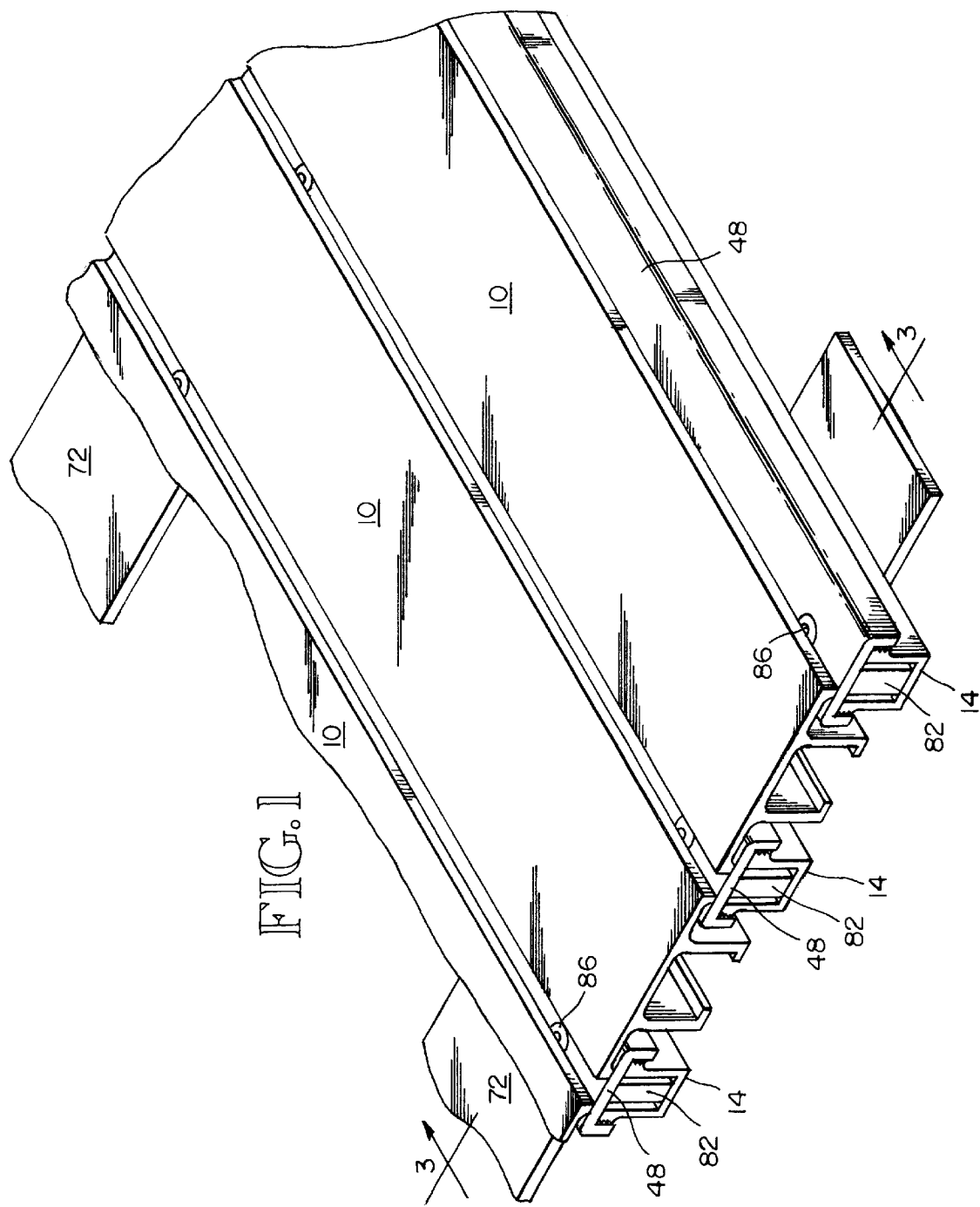

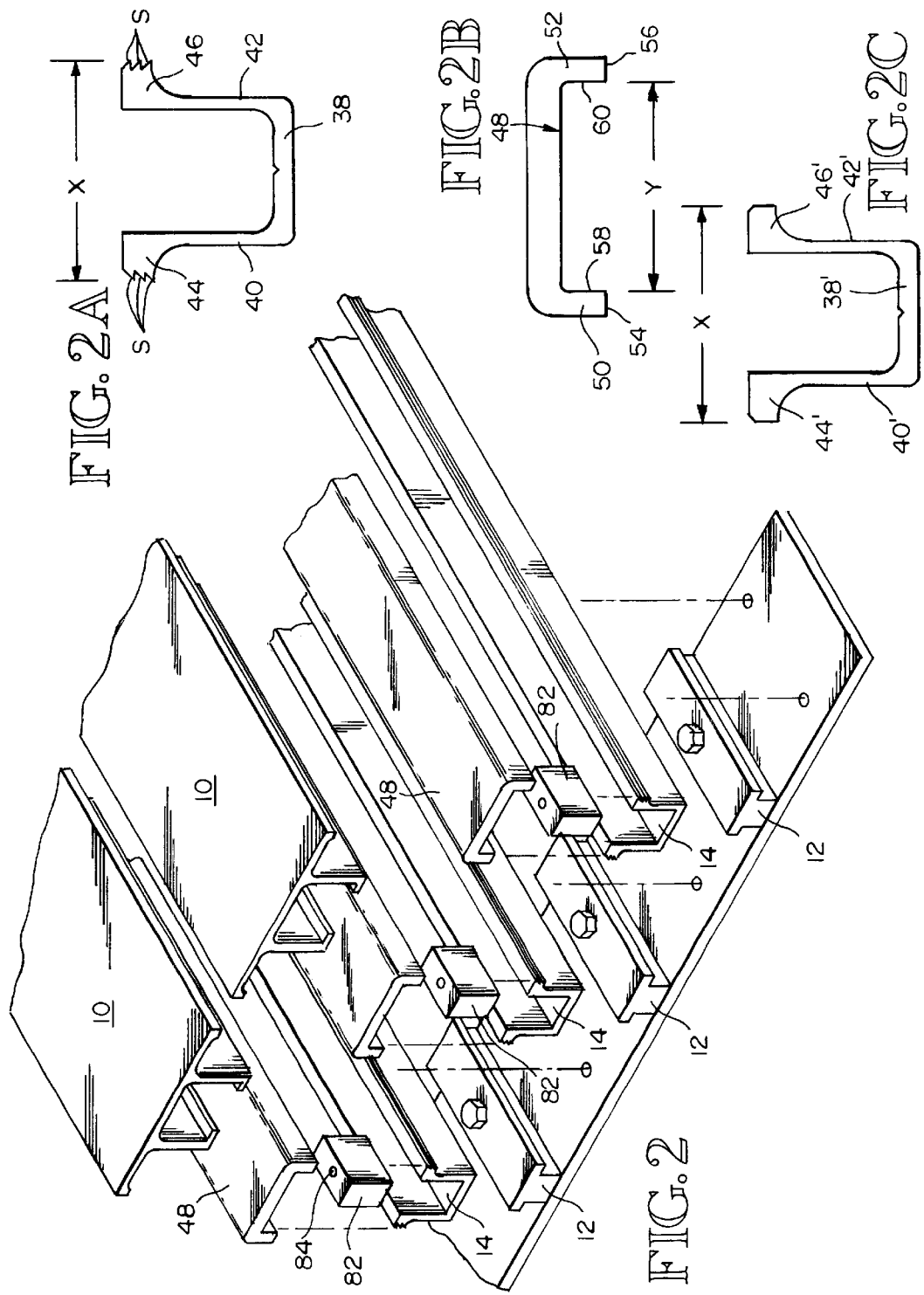

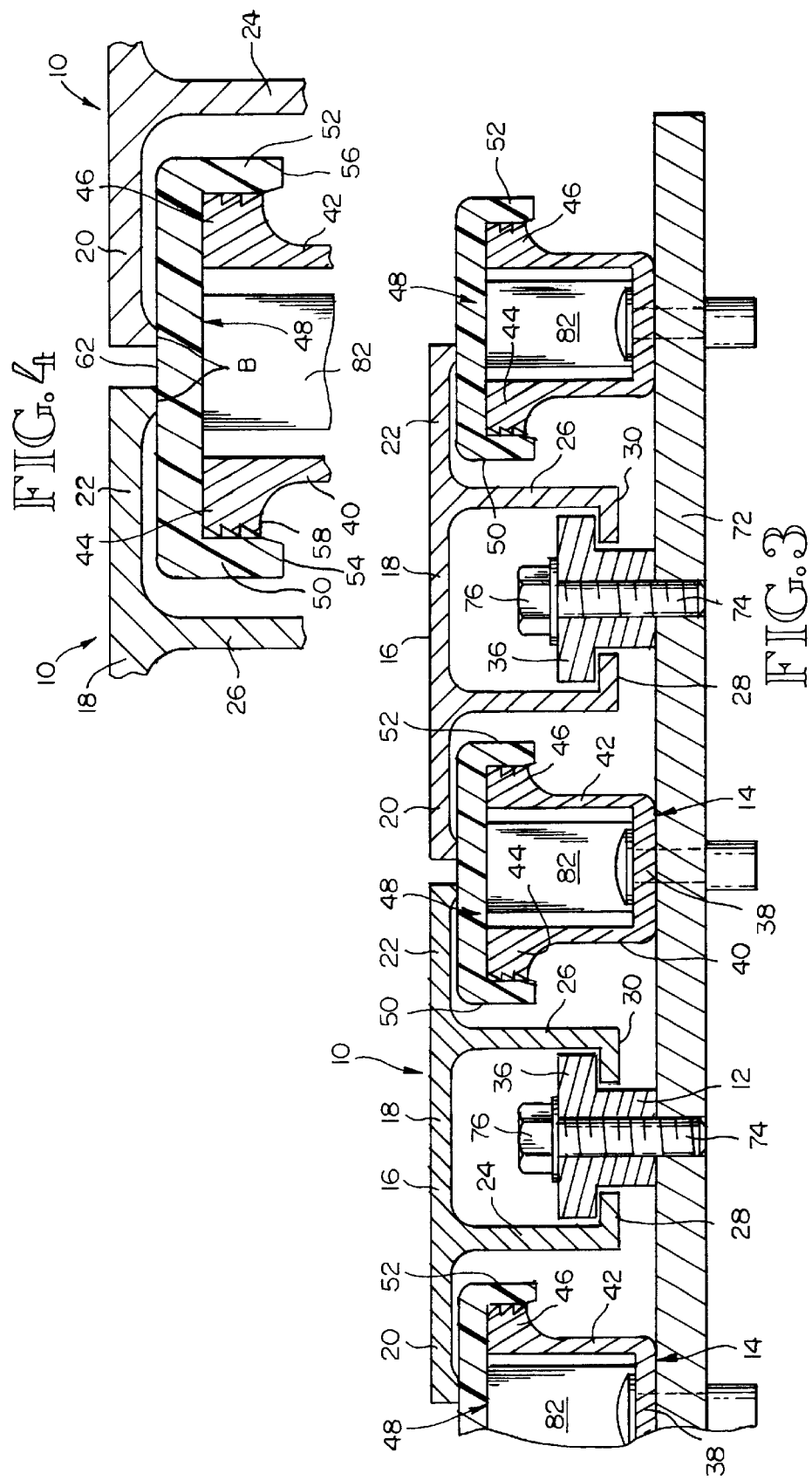

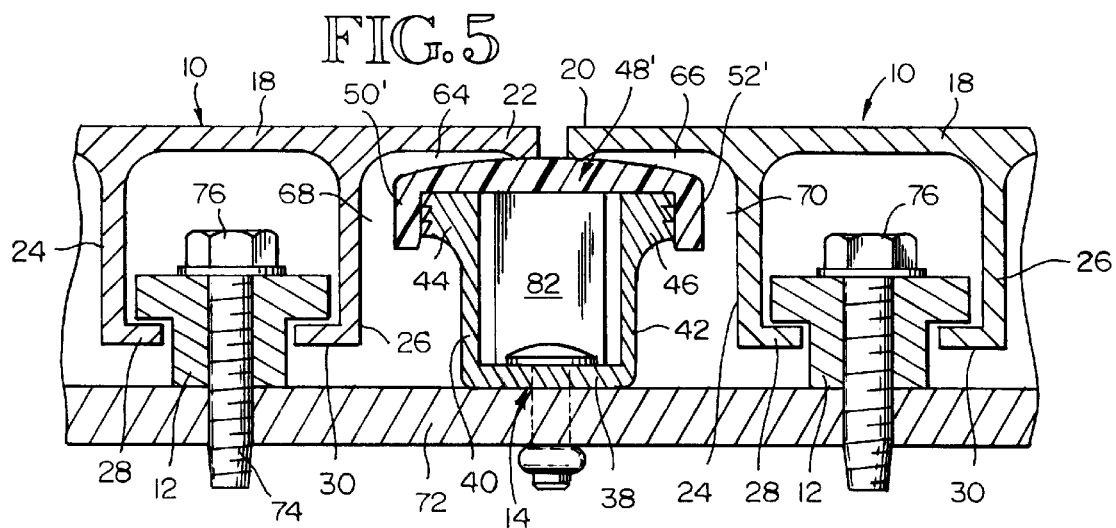
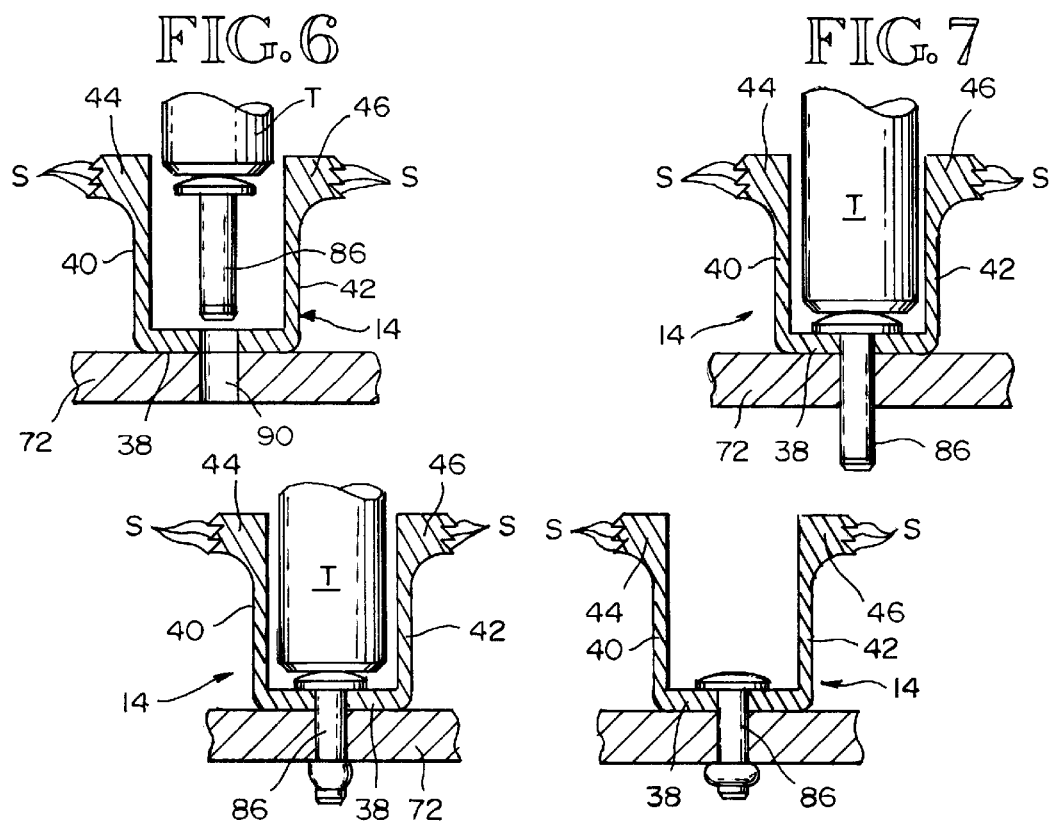

RECIPROCATING SLAT CONVEYORS

TECHNICAL FIELD

This invention relates to reciprocating slat conveyors composed of side-by-side conveyor slats, each having laterally outwardly extending opposite upper side portions, wherein each said slat side portion includes a longitudinal support that contacts and slides along a longitudinal bearing surface on a longitudinal support beam that is below the slat side portion. More particularly, the invention relates to the provision of an interference fit connection between the bearing members and the longitudinal support beams, allowing the bearing members to be installed by pushing them downwardly onto the support beams.

BACKGROUND OF THE INVENTION

The Background of the Invention portions of my U.S. Pat. No. 5,727,672, granted Mar. 17, 1998, my U.S. Pat. No. 5,850,905, granted Dec. 22, 1998, and my U.S. Pat. No. 5,996,772, granted Dec. 7, 1999, and of U.S. Pat. No. 5,560,472, granted Oct. 1, 1996 to Richard T. Gist, are incorporated herein by this specific reference.

The following United States patents show some prior art conveyor systems having some superficial appearance similarity to the systems of the present invention: U.S. Pat. No. 5,088,595, granted Feb. 18, 1992, to Olof A. Hallstrom; U.S. Pat. No. 5,165,525, granted Nov. 4, 1992, to Manfred W. Quaeck; U.S. Pat. No. 5,222,592, granted Jan. 29, 1993, to Manfred W. Quaeck; U.S. Pat. No. 5,228,556, granted Jul. 30, 1993, to Manfred W. Quaeck; and U.S. Pat. No. 5,323,894, granted Jun. 28, 1994, to Manfred W. Quaeck, and U.S. Pat. No. 6,257,396, granted Jul. 10, 2001, to Manfred W. Quaeck. All of these patents should be carefully considered for the purpose of putting the present invention into proper perspective relative to the prior art.

BRIEF SUMMARY OF THE INVENTION

Reciprocating slat conveyor systems of the present invention are basically characterized by side-by-side conveyor slats, each having opposite outer side portions. Each side portion includes a longitudinal support that contacts and slides along a longitudinal bearing surface on a longitudinal support beam that is below it.

According to the invention, the longitudinal support beams include laterally outwardly directed upper side portions having outer edges. The longitudinal bearing members each include a top portion, laterally spaced apart side portions that extend downwardly from the top portion to a lower edge, and inner side surfaces. The lateral distance between the outer edges of the side portions of the support beams is greater than the lateral distance between the inner side surfaces of the side portions of the bearing members. The bearing members are adapted to be secured to the support beams by positioning them above the support beams and pushing them downwardly so as to cause the support beams to enter into the bearing member and make an interference fit with the inner surfaces of the side portions of the bearing members.

Preferably, the support beam includes a bottom and a pair of sidewalls extending upwardly from the bottom. The upper side portions of the support beam are on the sidewalls of the support beam. In response to the interference fit caused by pushing the bearing members downwardly onto the support beams, the sidewalls of the support beams deflect inwardly and store spring energy that biases the sidewalls outwardly and the side portions of the support beams against the inner side surfaces of the bearing members.

The outer edges of the upper side portions of the support beams may include laterally outwardly directed serrations. In such case, the support beams are each preferably a metal extrusion and the serrations extend longitudinally of the support beam.

In preferred form, the upper side portions of the conveyor slats each includes a depending, longitudinal support and seal bead having a lower edge that contacts and slides along a longitudinal bearing/seal surface on the longitudinal bearing member.

Preferably also, the conveyor includes a support member below the support beam, on which the support beam rests. A fastener connects the support beam to the support member. The fastener extends through the bottom of the support beam. Preferably, the fastener has an enlarged upper end portion that bears downwardly against the bottom of the support beam. The fastener is of a type that can be installed from above the support beam.

These and other advantages, objects and features will become apparent from the following description of the illustrated embodiments, from the illustrations of the embodiments, from the principles that are exemplified by the embodiments, and from the claims, all of which provide a description of the invention.

BRIEF DESCRIPTION OF THE SEVERAL VIEWS OF THE DRAWING

In the drawings, like reference numerals and letters are used to designate like parts throughout the several views of the drawing, and FIG. 1 is a fragmentary pictorial view of a reciprocating slat conveyor, such view showing portions of three longitudinal support members, three bearing/seal members, three conveyor slats, and two supporting frame members;

FIG. 2 is an exploded pictorial view of most of the conveyor components shown by FIG. 1, such view showing portions of three guide beams and showing end blocks that are secured to the support beams so that end portions of the bearing/seal members can be secured to them;

FIG. 2A is an end elevational view of the guide beam, such view showing serrations at the outer edges of the upper side portions of a guide beam;

FIG. 2B is an end elevational view of the bearing member shown in FIGS. 1 and 2;

FIG. 2C is an end elevational view of a modified support beam, such support beam having outer edges on side portions that have no serrations;

FIG. 3 is a fragmentary end view of the conveyor component shown by FIGS. 1 and 2, such view showing fasteners used for connecting the support beams to a supporting frame structure and fasteners used to secure hold down members to the supporting frame structure;

FIG. 4 is an enlarged scale view of a region of FIG. 3 above one of the bearing/seal members;

FIG. 5 is a view similar to FIG. 3 but showing a bearing/seal member that has a convex top;

FIG. 6 is a fragmentary sectional view at the location of a fastener used for fastening the longitudinal support beams to a frame structure below them, such view showing a fastener and a tool used for securing the fastener, said fastener being inserted from above the support beam by a tool portion that enters into an open channel space in the support beam;

FIG. 7 is a view like FIG. 6, but showing the tool portion in a bottom position and showing the fastener in openings for it in the support beam and the support member below the support beam;

FIG. 8 is a view like FIGS. 6 and 7, but showing the tool being operated to secure the fastener; and FIG. 9 is a view like FIGS. 5–8, but showing the fastener installed and the tool removed.

DETAILED DESCRIPTION OF THE INVENTION

A substantially complete reciprocating slat conveyor system is disclosed by my U.S. Pat. No. 5,165,524, granted Nov. 24, 1992, and entitled Reciprocating Floor Conveyor. That patent discloses one form of drive unit for reciprocating the conveyor slats. Other suitable drive units, each having its own particular advantages, are disclosed by my U.S. Pat. No. 5,390,781, granted Feb. 21, 1995, and entitled Mounting Assembly and Method for Reciprocating Slat Conveyor, by my U.S. Pat. No. Re.35,022, granted Aug. 22, 1995, and entitled Reduced Size Drive/Frame Assembly For A Reciprocating Floor Conveyor, and by my U.S. Pat. No. 5,605,221, granted Feb. 25, 1997, and entitled Drive Unit With Bearing Mount. The contents of these three patents are hereby incorporated herein by this specific reference.

My aforementioned U.S. Pat. No. 5,165,524 illustrates and describes a popular operational sequence of reciprocating slat conveyors, shown by FIGS. 2–6 of the patent. FIGS. 7 and 8 of that patent show a typical framework that forms the base of the conveyor. It includes opposite side beams (designated 12 in that patent) interconnected by a plurality of longitudinally spaced apart transverse drive beams (designated 18 in that patent). Longitudinal guide beams (designated 20 in that patent) are mounted on the transverse beams 18. Bearings (designated 50 in that patent) are secured to the guide beams 20. The conveyor slats (designated 40 in that patent) sit down on and engage the bearings 52. The present invention relates to a similar arrangement but involves a different construction of the conveyor slats, the guiding and supporting beams for the conveyor slats, and the bearing/seal members that are associated with the conveyor slats. The system of the present invention has some superficial resemblance to the systems disclosed in my aforementioned U.S. Pat. No. 5,850,905. It also has some superficial resemblance to the system disclosed in the aforementioned U.S. Pat. No. 6,257,396, granted Jul. 10, 2001, to Manfred W. Quaeck. The differences, however, are substantial as explained in detail below.

FIGS. 1–4 herein show a reciprocating slat conveyor construction that is similar to yet different from the conveyor construction disclosed by my aforementioned U.S. Pat. No. 5,996,772. The present construction is similar in that the conveyor slats 10 are guided by longitudinal guide beams 12 and are supported independently of the guide beams by longitudinal support beams 14. The differences lie in the construction of the support beams 14 and bearing/seal members that are secured to the support beams 14.

In preferred form, the outer side edges of the flanges are provided with at least one outwardly directed serration S. Preferably, there are a plurality of serrations S on each edge.

A longitudinal bearing/seal member 48 sets down on and is secured to each support beam 14. The support beams 14 and bearing/seal members 48 extend the full length of the conveyor. As best shown by FIG. 3A, each bearing/seal member includes laterally spaced apart side portions 50, 52, extending downwardly from a central portion, each to a lower edge 54, 56. As shown by FIG. 2B, the side portions 50, 52 include substantially vertical inside surfaces 58, 60.

FIG. 2A shows three serrations S at the outside boundaries of the flanges 44, 46. FIG. 2C shows substantially flat surfaces at the outside boundaries of the flanges 44', 46'. In each embodiment, the width dimension x, measured between the two outer boundaries, is slightly larger than the width dimension y measured between the two inside surfaces 58, 60 on the side portions 50, 52 of the bearing/seal members 48. As will be apparent from FIG. 3A, a bearing/seal member 48 is set down onto each guide beam 14 with top portions 44, 46 of the support beams 14 in near alignment with the cavity in the bearing/seal member 48, below its top portion and between its side portions 50, 52. Following placement of the bearing/seal members 48 on the flanges 46, 48 of the support beams 14, a downward force is applied to the bearing/seal member 48, to cause it to move downwardly onto the top portions 44, 46 of the support beams 14.

The upper outer edges of the flanges 44, 46 are preferably beveled and the edges on the bearing seal members formed where the side surfaces 58, 60 meet the lower edge surfaces 54, 56 contact these beveled edges. The edge on the member 48 slides outwardly and downwardly along the beveled edge surface when the downward force is applied on the bearing/seal member 48. Each bearing/seal member 48 is pushed downwardly on its support beam 14 until the flanges 44, 46 are in the cavity in the bearing/seal member 48. To make this happen, the sidewalls 40, 42 of the support beams 14 will deflect inwardly somewhat and there may be some outward movement of the side portions 50, 52 of the bearing/seal member 48. When the flanges 44, 46 have been moved upwardly into the bearing/seal member as far as they will move, there is an interference fit between the support beams 14 and the bearing/seal members 48.

In the preferred embodiment, the serrations S have upper surfaces that slope downwardly and they extend outwardly to edges. The slope helps the flanges 44, 46 move upwardly into the cavity in the bearing/seal member 48. The slopes exert an outward force on the side portions 50, 52 of the bearing/seal member 48, causing them to move apart somewhat. In addition, reaction forces are created between the flanges 44, 46 and the side portions 50, 52, causing the sidewalls 40, 42 to deflect inwardly, like leaf springs. Spring energy is stored in the sidewalls 40, 42 in response to their movement. This spring energy serves to bias the serrations S outwardly into gripping contact with the inner side surfaces 58, 60 of the bearing/seal members 48. The serrations S provide a good frictional grip on the sidewalls 58, 60 but do not actually penetrate into the sidewalls 58, 60. In the second embodiment (FIG. 2C), there is also an interference fit and the sidewalls 40, 42 bend inwardly. In this embodiment, the frictional grip is between the substantial flat outer surfaces on the flanges 44, 46 and the substantially flat inner surfaces 58, 60 on the bearing/seal members 48.

As shown by FIGS. 3 and 3A, the top portion of the bearing/seal member 48 extends over the top opening in the support beam 14. Even though there is an open space below it, the center portion of the bearing/seal member 48 is relatively stiff and can support the weight of the slats 10 and the load that is on the slats 10.

The upper side portions 20, 22 of the conveyor slats 10 preferably each includes a depending longitudinal support and seal bead B having a lower edge that contacts and slides along the longitudinal bearing/seal surface provided by the upper surface 62 of the bearing/seal member 48. The beads B may be depending lips or flanges that form the outer edge boundaries of the side portions 20, 22 of the conveyor slats 10. The lower edges of the beads B may be laterally rounded, laterally sharp edged, or laterally blunt, but making a relatively narrow line contact with the bearing slat seal surface 62.

The bearing/seal members 48 are constructed from a high molecular weight resonance material, sometimes referred to in the trade as UHMW material. This material is available from several manufacturers. It is strong and is easily formed to the desired configuration. The material has exceptionally low surface abrasion which translates into it providing an excellent bearing relationship between the conveyor slats 10 and the support beams 14. The substantially narrow line contact between the depending beads B and the bearing/seal members 48 provides a seal that when there is a load on the conveyor seals against the passage of particulate material, including "fines" of 100 mesh or smaller, from the region above the conveyor slats 10 to the region below the conveyor slats 10. When the conveyor is under load, the contact of the lower edges of the beads B with the bearing/seal surfaces 62 of the bearing/seal members 48, provides an effective and very simple seal against the movement of particulate material downwardly to below the conveyor slats 10. Over time, in response to reciprocal movement of the conveyor slats 10, the contact of the bead edges with the bearing/seal surface may form grooves in the bearing/seal surface. At the same time, because the contact of the conveyor slats 10 with the bearing/seal members 48 occurs along relatively narrow lines, and because the bearing/seal material has very low friction characteristics, there is a minimum of resistance to sliding movement of the conveyor slats 10 front to rear and back along the bearing/seal members 48.

According to an aspect of the invention, the upper surface 62' on the bearing/seal members 48' may be laterally convex. This is shown by FIG. 5. The surfaces 62' may extend laterally outwardly to upper rounded corners and vertical side surfaces that are spaced from the slat walls 24, 26. As a result, there are avenues 64, 66 provided that allow fines that pass the seal regions to move easily into open spaces 68, 70 that are formed between the support beams 14 and the depending leg portions 24, 26 of the conveyor slats 10. The convex nature of the surface 62' encourages fines to gravitate downwardly into the spaces 64, 66.

As discussed above, when there is a load on the conveyor slats 10, the beads B are held into a relatively tight sealing relationship with the bearing/seal surfaces 62, 62', and the migration of fines from above the conveyor slats 10 to below the conveyor slats 10 is substantially arrested. However, when there is no load on the conveyor slats 10, and some fines remain, motion of the conveyor will cause the conveyor slats 10 to want to move up and down and sideways to some extent. This movement is permitted and in effect encouraged by the fact that the conveyor slats 10 merely sit down on the bearing/seal members 48 and there is a loose fit of a guide beams 12 in a space that is defined horizontally between the depending portions 24, 26, and vertically between the top section 16 and the bottom flange portions 28, 30 of the conveyor slats 10. As the conveyor slats 10 move up and down sideways, gaps are open between the beads B and the bearing/seal surfaces 62, 62'. This happens each time the conveyor slats 10 are bounced upwardly off from their support on the bearing/seal members 48. When this happens, the fines migrate through the vertical gaps into the avenues 64, 66. Once in the avenues 64, 66, the fines are influenced by the convex upper surface 62' into migrating into the spaces 68, 70.

The guide beams 12 and the support beams 14 extend longitudinally across transverse frame beams which are longitudinally spaced apart. The upper portions of these beams are designated 72 in the drawing.

As shown by FIGS. 2, 3 and 5, the guide beams 12 may be bolted to the frame members 72. The frame members 72 may be provided with internally threaded openings to receive the threads of bolts 76. Or, the threaded portions of the bolts 76 may extend through openings in the frame members 72 and be secured to nuts (not shown) which are situated below the frame members 72. The guide members 12 are elongated in that they are longer than they are wide and tall. They may extend the full length of the conveyor. Or, they can be constructed in sections that are positioned or are spaced apart longitudinally. FIG. 2 shows relatively short guide beams 12 secured to frame member 70. Additional guide beams 12 will be secured to the frame member 72 and to each additional frame member of this type that the conveyor includes.

FIG. 2 shows a connector block 82 at the end of each support beam 14. The connector blocks 82 are preferably blocks of plastic. The connector blocks 82 are of a height equal to the vertical distance between the upper surface of the bottom wall 38 and the upper surfaces of the flanges 44, 46. A center portion of the bearing/seal member 48 sits on the top of each connector block 82. A fastener 86 (FIG. 1) extends through an opening in the top wall of the bearing/seal member 48 and then through the opening 84 in the block 82. This fastener either screws into a threaded opening in the frame members 70, 72 or extends through an opening in the frame member 70, 72 to be engaged by a nut positioned below the frame member 70, 72. The head of this fastener is countersunk into the upper surface 62 of the bearing/seal member 48 (FIG. 1). This fastener prevents endwise, sideways and up and down movement of the bearing/seal member 48 relative to the guide beam 14.

FIG. 5 shows a bolt extending downwardly from an installation tool T towards openings 88, 90 in the bottom wall 38 of the support beam 14. When in place, the bolt head rests on and bears downwardly against the bottom wall 38. A threaded lower portion of the bolt extends through an opening in the frame member 72. A tubular nut is provided on the threaded portion of the fastener.

FIGS. 7 and 8 show the head of the bolt installing tool T situated within the channel space that is formed by and between the sidewalls 40, 42 and above the bottom wall 38. The tool T is shown in the process of installing a type of fastener that can be installed from one side of the connection. In other words, it is not necessary for anyone to be below the conveyor for the purpose of installing a nut. The preferred fastener includes a nut forming member that surrounds the bolt and is inserted through the bolt hole with the bolt. After the nut forming member is below the bolt hole, the tool is operated to pull on the bolt. This creates a bulge in the nut forming member below the member 72, preventing the nut forming member from moving back through the openings 88, 90. This is a very popular and readily available fastener. A user might also want to install the guide beams 14 from above by use of pop rivets. Pop rivets can also be installed from one side of the connection. In this case, it would be installed from above the connection, by use of a tool that is inserted into the channel space of the support beams 14. Of course, it is still possible to use fasteners that require access from both above and below the connection. For example, a bolt can be inserted downwardly through openings in the wall 38 and the frame member, and a nut (not shown) applied to the lower end of the bolt. Or, the bolt can be inserted upwardly through opening in the frame member and the bottom 38, and the nut applied to the threaded upper end of the bolt.

A typical slat conveyor may measure somewhere between twelve to twenty-four slats wide and between twenty to fifty feet in length. The conveyor slats 10 may include a plank-like upper surface 16 that measures between three and a half to six inches in width. The upper or plank portion 16 is divided into three sections. There is a center section 18 that is flanked by two opposite side sections 20, 22. Depending legs 24, 26 depend from each location where the center section 18 meets a side portion 20, 22. Each depending leg 24, 26 includes a laterally inwardly directed bottom flange 28, 30. The flanges 28, 30 define between them a longitudinally extending slot opening 32. The guide beams 12 each have a narrow base portion 34 and a wider top portion 36. The base portion 34 is narrower than the slot opening 32 whereas the top portion 36 is wider than the slot opening 32. Preferably, there is a loose fit of the conveyor slats 10 on the guide beams 12. This is done so that when there is no load on the conveyor slats 10, the conveyor slat 10 can move in position relative to the guide beams 12, both horizontally and vertically. The purpose of this feature is described later in this document.

Preferably, the support beams 14 are flanged channel members. Each comprises a bottom wall 38 that extends between opposite sidewalls 40, 42. The sidewalls 40, 42 extend upwardly from and substantially perpendicular to the bottom wall 38. The tops of the channel beams 14 are open. A pair of flanges 44, 46 project laterally outwardly from the sidewalls 40, 42, at the tops of the beams 14.

Preferably, the support beams 14 are extruded from a suitable metal, e.g. a structural aluminum alloy. The bearing/seal members 48 are extruded from a suitable bearing material, e.g. a high molecular resonance material, sometimes referred to in the trade as UHMW material.

The construction of the support beams 14 and the bearing/seal members 48 that is illustrated and described above permits a rather easy installation of the bearing/seal members 48 onto the support beams 14 from above the support beams 14. It is relatively easy to set the bearing/seal members 48 downwardly on top of support beams 14 and then push downwardly on the bearing/seal members 48, so as to push the two together and force the flanges 44, 46 upwardly into the cavity in the bearing/seal member. The connection made is a very secure connection. Of course, once the conveyor slats 10 are installed, the bearing/seal members 48 are trapped below the conveyor slats 10 and have no place to go. At the same time, it is relatively easy to remove the bearing/seal members 48 from the support beams 14 when it is necessary to replace them. After the conveyor slats 10 are removed, one need only grab one end of a bearing/seal member 48 and pull upwardly on it. This will cause the interference or friction fit to be released and the bearing/seal member 48 to peel off the support beams 14.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents.

What is claimed is:

1. In a reciprocating slat conveyor composed of side-by-side conveyor slats, each having laterally outwardly extending opposite upper side portions, each said side portion including a longitudinal support that contacts and slides along a longitudinal bearing surface on a longitudinal support beam that is below it, a conveyor structure comprising:

wherein said longitudinal support beam includes laterally outwardly directed side portions having outer edges;

wherein each said longitudinal bearing member includes a top portion and laterally spaced apart side portions extending downwardly from the top portion to a lower edge and having inner surfaces;

wherein the lateral distance between the outer edges of the side portions of the support beam is greater than the lateral distance between the inner surfaces of the side portions of the bearing member; and wherein said bearing member is adapted to be secured to the support beam by positioning it above the support beam and pushing down on the bearing member, so as to cause the support beam to enter into the bearing member and make an interference fit with the inner surfaces of the side portions of the bearing member.

2. The conveyor structure of claim 1, wherein the support beam includes a bottom and a pair of sidewalls extending upwardly from the bottom, wherein the side portions are on the sidewalls of the support beam, and wherein in response to the interference fit caused by pushing the bearing member downwardly onto the support beam, the sidewalls of the support beam deflect inwardly and store spring energy that biases the sidewalls outwardly and the side portions of the support beam against the inner side surfaces of the bearing member.

3. The conveyor structure of claim 2, wherein the outer edges of the side portions of the support beam include laterally outwardly directed serrations.

4. The conveyor structure of claim 3, wherein the support beam is a metal extrusion and the serrations extend longitudinally of the support beam.

5. The conveyor structure of claim 1, wherein the side portions of the support beam include laterally outwardly directed serrations.

6. The conveyor structure of claim 5, wherein the support beam is a metal extrusion and the serrations extend longitudinally of the support beam.

7. The conveyor structure of claim 1, wherein the upper side portions of the conveyor slats each includes a depending, longitudinal support and seal bead having a lower edge that contacts and slides along a longitudinal bearing/seal surface on the longitudinal bearing member.

8. The conveyor structure of claim 7, wherein the support beam includes a bottom and a pair of sidewalls extending upwardly from the bottom, wherein the side portions are on the sidewalls of the support beam, and wherein response to the interference fit caused by pushing the bearing member downwardly onto the support beam, the sidewalls of the support beam deflect inwardly and store spring energy that biases the sidewalls outwardly and the side portions of the support beam against the inner side surfaces of the bearing member.

9. The conveyor structure of claim 8, wherein the side portions of the support beam include laterally outwardly directed serrations.

10. The conveyor structure of claim 9, wherein the support beam is a metal extrusion and the serrations extend longitudinally of the support beam.

11. The conveyor structure of claim 7, wherein the side portions of the support beam include laterally outwardly directed serrations.

12. The conveyor structure of claim 11, wherein the support beam is a metal extrusion and the serrations extend longitudinally of the support beam.

13. The conveyor structure of claim 2, further comprising a support member below said support beam, on which said support beam rests, and a fastener connecting said support beam to said support member, said fastener extending through the bottom of the support beam.

14. The conveyor structure of claim 2, wherein said fastener has an enlarged upper end portion that bears downwardly against the bottom of the support beam.

15. The conveyor structure of claim 14, wherein the fastener is of a type that can be installed from above the support beam.

16. The conveyor structure of claim 13, wherein the opposite upper side portions of the conveyor slats each includes a depending, longitudinal support and seal bead having a lower edge that contacts and slides along the longitudinal bearing/seal surface on the longitudinal bearing member.

* * * * *